Jan. 18, 1927.　　　A. B. CUNNINGHAM　　　1,614,457
PRESSURE INDICATOR
Filed Oct. 4, 1923　　　3 Sheets-Sheet 2

Witness:
Dave S. Magnusson

Inventor:
Arthur B. Cunningham
By Nissen & Crane
Attys.

Jan. 18, 1927. 1,614,457
A. B. CUNNINGHAM
PRESSURE INDICATOR
Filed Oct. 4, 1923  3 Sheets-Sheet 3
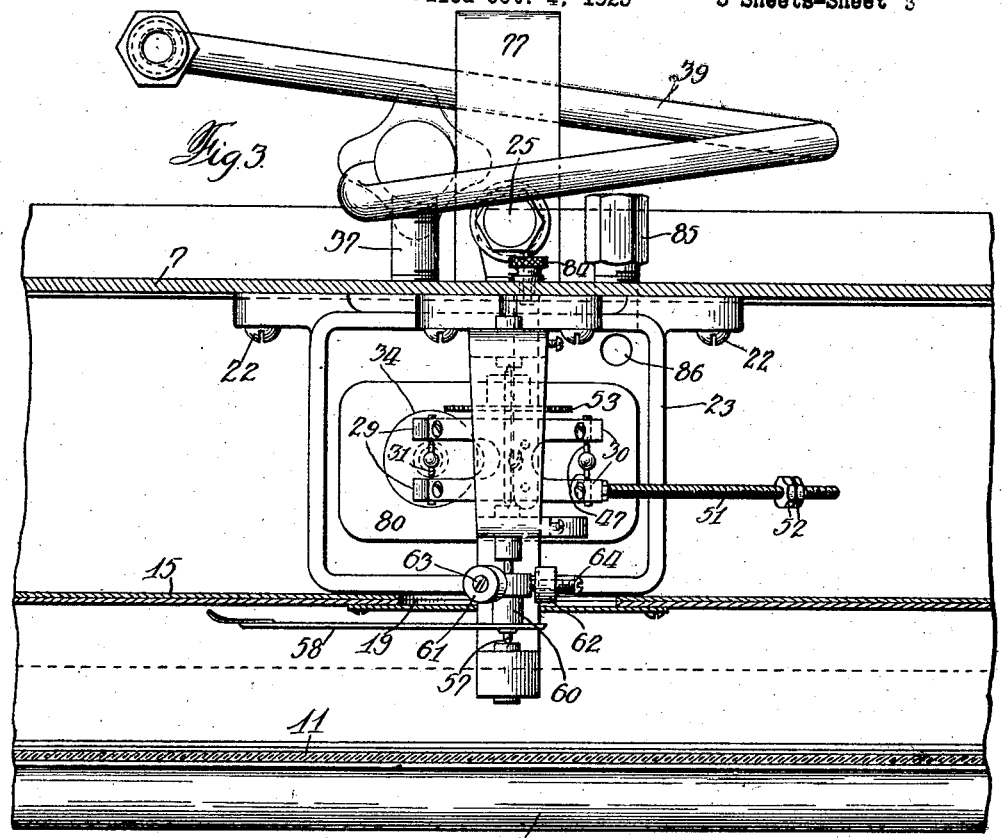
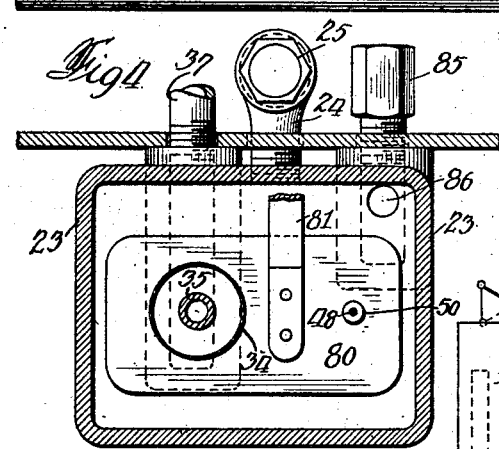
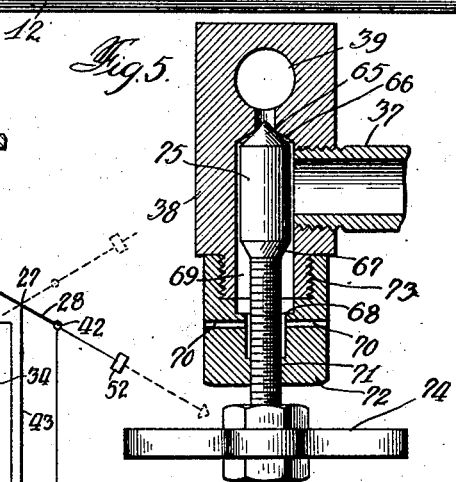

Patented Jan. 18, 1927.

1,614,457

UNITED STATES PATENT OFFICE.

ARTHUR B. CUNNINGHAM, OF CHICAGO, ILLINOIS, ASSIGNOR TO REPUBLIC FLOW METERS CO., OF CHICAGO, ILLINOIS, A CORPORATION OF ILLINOIS.

PRESSURE INDICATOR.

Application filed Otober 4, 1923. Serial No. 666,465.

My invention relates to pressure indicators of the type having a bell float sealed with a liquid to form a gas holder and one of its objects is the provision of improved and efficient mechanism for securing an indication on a dial of a positive or negative pressure independent of the level of the liquid medium used as a liquid seal.

More particularly it is the object of the present invention to combine with a bell float and an indicator, counterweighting mechanism so as to effect proper indications on a dial of low positive or negative pressures or furnace drafts, although the depth of the liquid forming the liquid seal of the bell may vary within predetermined limits.

A further object of the invention is the provision of improved and efficient mechanism for connecting at will the interior of the bell to the atmosphere to secure atmospheric pressure within the bell when mounting the instrument to secure an initial or zero reading or indication.

Another object of the invention is the provision of improved mechanism for mounting the draft indicator to permit tilting thereof to secure a zero indication of the dial hand.

Other objects of the invention will appear hereinafter, the novel features and combinations being set forth in the appended claims.

Referring to the accompanying drawings—

Fig. 3 is a sectional plan view of my improved indicating mechanism,

Fig. 4 is a sectional plan view taken on the line 4—4 of Fig. 2;

Fig. 5 is a sectional elevation taken on the line 5—5 of Fig. 2, and enlarged; and Fig. 6 is a diagrammatic view to show the angular relation of the counterweight mechanism.

Figure 2:
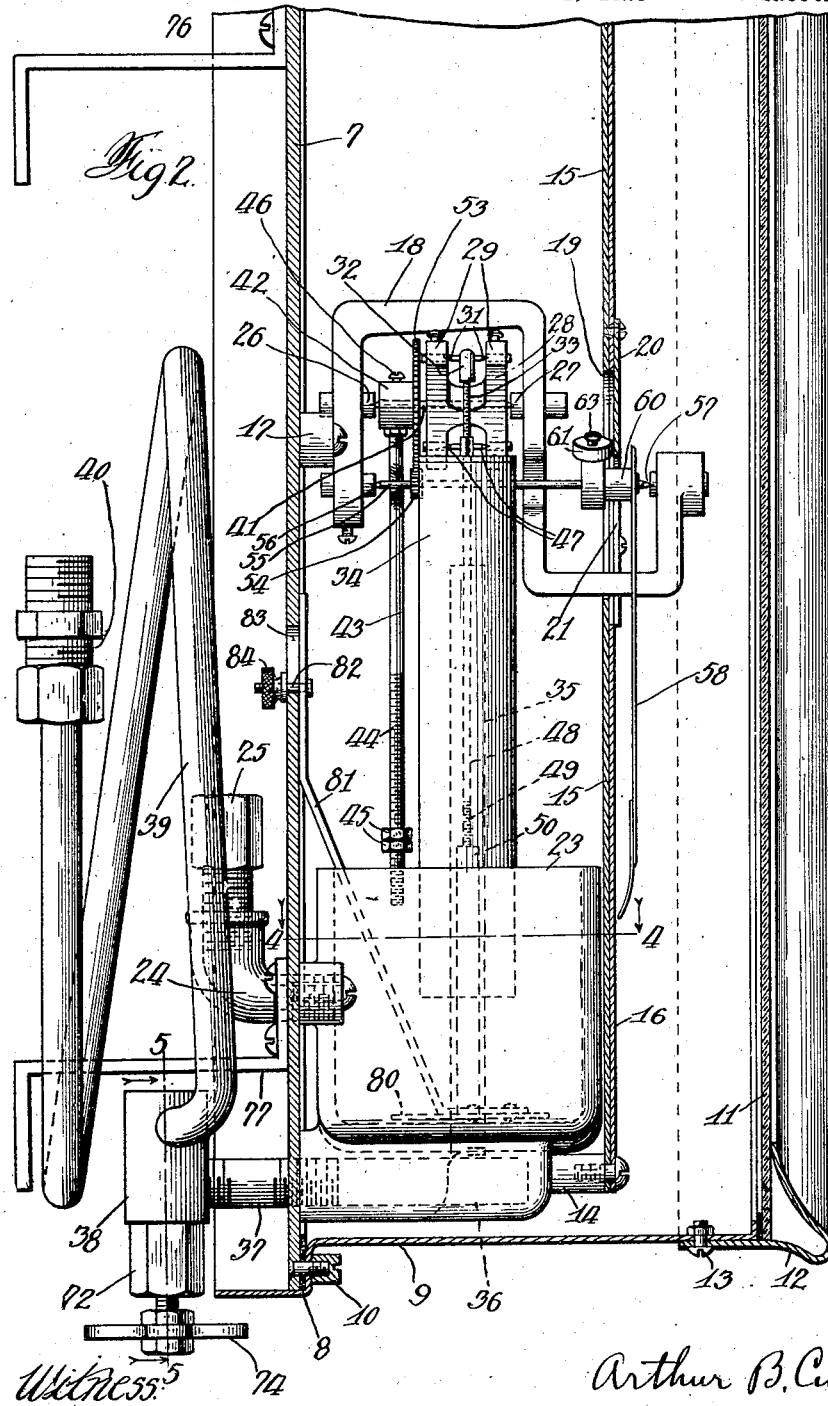
Fig. 2 is a central sectional elevation of Fig. 1.

Referring to Fig. 2, 7 indicates a base plate circular in shape and having spaced around its periphery a series of screws 8 over which are adapted to be placed a series of circumferentially spaced openings of a cylindrical casing 9, cap screws 10 being relied on to secure the casing 9 to the base plate 7. A glass disc 11 may be secured to the cylindrical casing 9 by means of a ring 12 secured to the casing 9 by means of bolts 13.

Mounted on a series of circumferentially spaced posts 14 is a metal disc 15 adapted to receive a paper dial 16 having spaced indications thereon extending over approximately 288°.

Rigidly secured at 17 to the central portion of the base plate 7 is a frame 18 which is S-shaped in side view and extends through an opening 19 in the dial plate 15. A small plate 20 is secured to the dial plate 15 so as to cover nearly all of the opening 19 but providing ample space by means of an inverted U-shaped opening 21 for the lower forward portion of the S-shaped frame 18.

To the lower portion of the base plate 7 is secured at 22, 22 a well 23 open on its upper side and adapted to contain a liquid, such as oil. An elbow pipe 24 leads through the back wall of the well 23 and is provided with a screw-threaded opening to receive the screw cap 25 having a hexagonal head. By removing the screw cap 25 oil may be introduced into the well 23 from the rear of the draft indicator. Inasmuch as the upper side of the well 23 is open between the base plate 7 and the dial plate 15 oil may be introduced into this well to a level approximately to a depth corresponding to the upper end of the elbow pipe 24 after which the screw cap 25 may be inserted in the upper open end of the pipe 24 to close the same. It is not necessary to turn the cap 25 until it fits tight because there is neither pressure nor vacuum against it.

Pivotally connected at 26, 27 is a walking beam 28 having bifurcated extensions 29 and 30 at opposite sides of the fulcrum thereof, as shown in Fig. 3. Between the arms 29 by means of cone bearings 31 is suspended a cap 32 having a screw-threaded rod 33 which is secured at its lower end to the upper closed end of the bell 34. This bell 34 is hollow with its lower open end extending into the well 23, as shown in Figs. 1 and 2, a sufficient distance to be partially immersed in the oil in the well 23.

Figure 1:
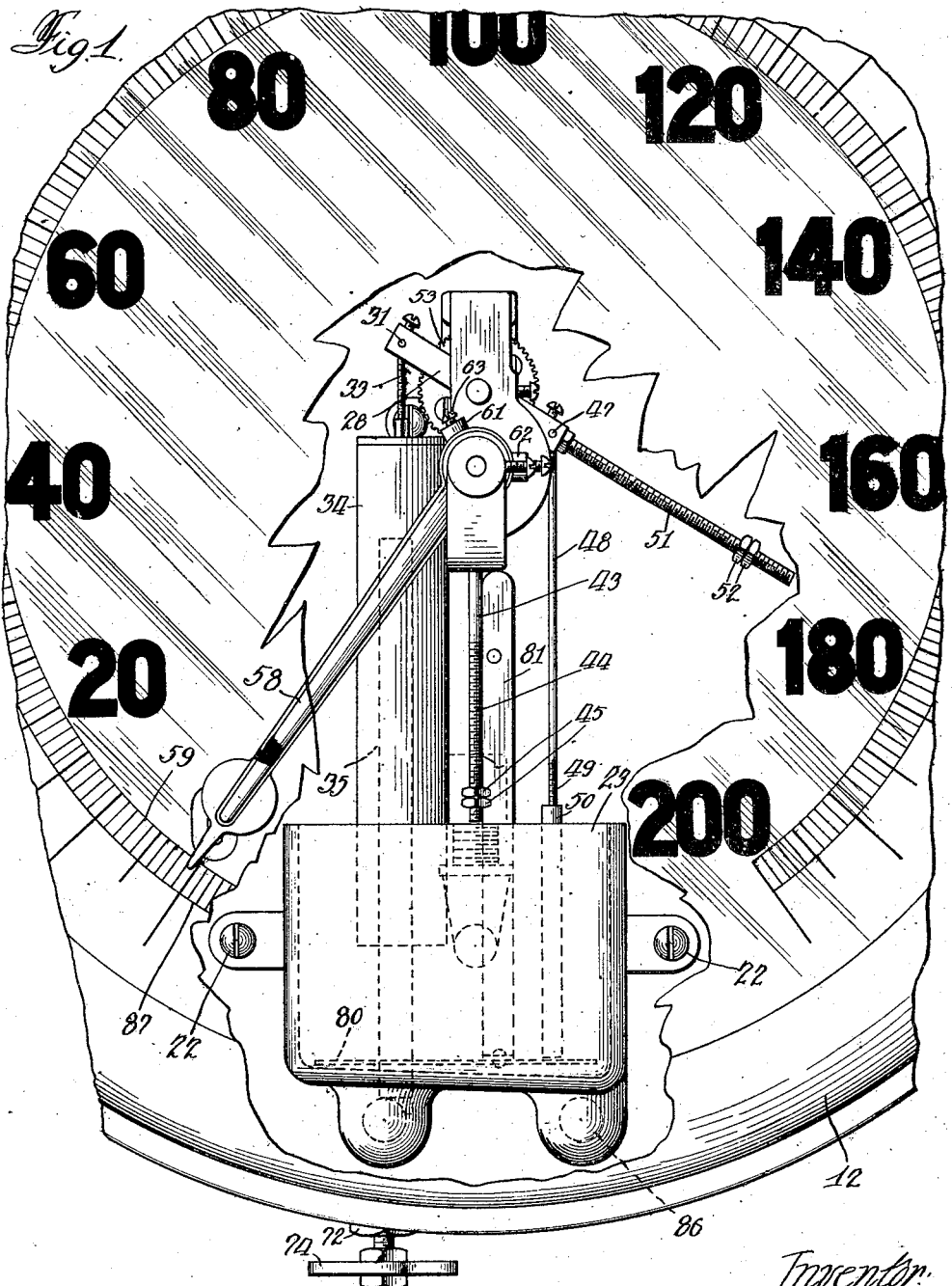
Fig. 1 is an elevational view of my improved mechanism showing a portion of the dial and the operating mechanism for the pointer movable over the dial.

A draft flue 35 is secured rigidly to the well 23 and extends upwardly from the bottom thereof through the center of the bell 34 into the upper portion thereof, as shown in Figs. 1 and 2, in dotted lines. The upper end of the draft flue opens into the chamber within the bell 34. The lower end of the draft flue 35 communicates with the chamber 36 in a casting integral with the well 23. A pipe 37 connects the chamber 36 with a valve 38 to which is connected a curved pipe 39 provided with means shown at 40 for connecting the pipe 39 to another pipe leading to a furnace draft. The pipe 39 is preferably coiled to secure flexibility in mounting the instrument and connecting it to the draft which is to be indicated.

Adjustably secured to the shaft 41 to which the walking beam 28 is rigidly connected, is a hub 42 from which is suspended a vertical pendulum rod 43, screw-threaded at 44 to receive adjusting nuts 45 to act as adjusting weights when being moved up and down along the screw-threaded portion 44. The hub 42 may be secured in adjusted position on the shaft 41 by means of the set screw 46.

By means of cone bearings 47 located between the arms 30 of the walking beam 28 is suspended a vertical rod 48, the lower end of which is screw-threaded at 49 for varying if desired the adjusted elevation of the cylindrical weight 50 in position to be immersed in the oil in the well 23. As shown in Fig. 1, the upper portion as well as the lower portion of the weight 50 has vertical surfaces. The lower portion of the bell 34 which is immersed in the liquid is also provided with vertical faces both on the exterior and interior. The cross-sectional area of the weight 50 is equal to the cross-sectional area of the bell 34 for a purpose hereinafter explained. By reason of the pivoted cone bearings 31 and 47 the rods 33 and 48 remain in vertical positions when the walking beam 28 is rocked in one direction or the other. Therefore the bell 34 and the weight 50 will also occupy vertical positions when moved up and down. Secured rigidly to the walking beam 28 is a screw-threaded rod 51 extending toward the right as viewed in Fig. 1 and in alinement with the walking beam. The rod 51 is provided with nuts 52 to act as an adjustable weight movable along the rod 51.

As shown in Fig. 2, a gear 53 is secured to the shaft 41 meshing with a smaller gear 54 secured to the shaft 55 which is provided with cone bearings 56 and 57 at its ends and supported by the frame 18. The various cone bearings are adjustable to take up the wear and to support the various parts for freedom of movement.

On the forward end of the shaft 55 is secured a pointer 58 in position to move over the scale 59 on the dial 16. The hub 60 of the pointer 58 is provided with counterweights 61 and 62 mounted on screws 63 and 64, respectively, which are carried by the hub 60. The screws 63 and 64 with the counterweights 61 and 62 thereon are respectively spaced apart at an angle to about 120° from each other with the counterweight 61 on one side of the pivotal support and about 120° from the counterweight 62 on the other side, as shown in Fig. 1. This arrangement will permit accurate balancing of the pointer arm 58 so that it will tend to stay where put relative to the vertical dial and the tendency of the pointer arm to move itself over any portion of the scale on the dial is reduced to a minimum.

When the pointer 58 is at zero on the dial the parts will occupy the relative positions shown in Fig. 1 provided the interior of the bell 34 is open to the atmosphere. To secure this result and to facilitate setting the instrument for zero reading of the pointer on the dial, the valve 38 is provided to close the connection from the draft or pressure pipe 39 to the draft or pressure flue 35. The valve 38 is shown in enlarged cross-section in Fig. 5. The valve casing 38 is connected to the pipe 39 and also to the pipe 37. A needle valve 65 is adapted to be moved against the valve seat 66 so as to close the communication from the pipe 37 to the pipe 39. At the same time that the valve 65 is moved against the seat 66 the lower valve 67 is raised off the seat 68 so as to afford communication between the pipe 37 and the chamber 69 which leads downwardly through the openings 70 to the atmosphere. The valve stem 71 is screw-threaded through the casting 72 which in turn is threaded onto the valve casing 38, as shown at 73. A wing nut 74 may be used for turning the valve stem 71 so as to lift or lower the double valve 75. When the valve 65 is closed, as shown in Fig. 5, the suction due to the draft is cut off from the draft flue 35 in the bell 34 and the chamber within the bell is connected to the atmosphere through the flue 35, chamber 36, pipe 37, chamber 69, and lateral passageways 70. When atmospheric pressure is introduced in this manner into the interior of the bell 34 it is free to move up and down so that the instrument may be adjusted so that the pendulum rod 43 will hang vertical and the pointer 58 will be located at the zero point on the dial. To facilitate mounting the instrument on a vertical wall brackets 76 and 77 are secured to the back of the base plate 7, as shown in Fig 2. These oval openings may be placed over bolts secured to the wall and the instrument tilted sidewise until it is in proper position and then the base plate 7 may be rigidly connected to such wall.

When the parts are in their normal operating positions, as shown in Fig. 1, the bell 34 is up from the bottom of the well 23 whereas the weight 50 is near such bottom. To keep the parts from vibrating during transportation a false bottom 80 is located in the well 23 and provided with an upwardly extending operating plate 81 to the upper portion of which is secured a rod 82 in position to project through a slot 83 in the back base plate 7, as shown in Fig. 2. The rod 82 is screw-threaded to receive the thumb nut 84. When the latter is loosened and moves upwardly the false bottom 80 will lift the weight 50 until the false bottom strikes against the lower edge of the bell 34 when the thumb nut 84 may again be tightened so as to hold the weight 50 and the bell 34 against the plate 80 and thus hold the parts against vibration or movement during transportation.

The operation of the construction shown in the drawings involves the principle of the bell float, the balance 51, 52 and the plumb weight 45 so combined as to cause the pointer 58 on the dial to indicate an absolute pressure independent of the level of the liquid medium used in the well 23. The bell float 34, sealed by the liquid in the well 23 is adapted to indicate low negative pressures or furnace drafts. If the depth of the liquid in the well had to be constant there would have to be tedious checking and re-filling of the liquid at frequent intervals and any casual change in the quantity of liquid would produce a corresponding change in the zero reading of the instrument. It is therefore desirable to be enabled to secure zero setting of the instrument without considerable attention afterward to keep it in proper adjustment.

To reduce these difficulties to a minimum the acting force of the pressure difference is resisted by a positive weight acting on a balance and not by the buoyancy of the material. By referring to the diagrammatic sketch shown in Fig. 6 it will be seen that such a balancing member 50 is suspended from the point 47 or the beam 28. The balancing member 50 is so designed that the volume of liquid displaced by it is equivalent to the volume of liquid displaced by the walls of the float 34. That is to say, the cross-section of the material in member 50 is the same as the cross-section of the material in float 34. The beam 28 is pivoted at the fulcrum 27 and carries with it the weight 45 rigidly attached to the beam. An auxiliary weight 52 is extended from the beam 28 for the purpose of adjusting the weight of member 50 to be equal to the weight of the float 34 so that the weight 45 remains the only resisting member to the motion of the beam 28.

Since the cross-section of the walls of float 34 is the same as the cross-section of the material in the balancing member 50 the weight of the two members remains the same for any change of level of the oil in the oil chamber 23. There is a small effect of buoyancy due to the movement of the float 34 and the balancing weight 50, but that introduces a very small difference proportional to the motion and its effect is included in the value of the weight 45.

When the indicator is to be installed, a location is selected which will not be extremely hot and where it may be easily seen by the operator. It is secured to the wall by means of the brackets 76 and 77 and bolts in a vertical position. The nuts on the bolts are released so that the elongated holes 78 and 79 in the brackets will permit the instrument to be tilted to the right or left until the pointer 58 indicates zero on the dial. The nuts are then tightened and the instrument held securely in position with the pointer on zero.

The wing nut 74 is next turned toward the right so as to set the needle 65 against the seat 66, as shown in Fig. 5, thereby cutting off the draft pipe 39 from the draft flue 35. This is for the purpose of enabling the instrument to be set at atmospheric pressure with the pendulum rod 43 hanging vertically downward with the pointer 58 at the zero mark on the dial. The float 34 and balancing weight 50 are suspended from the walking beam 28 in position to extend into the oil cup 23. When the pointer 58 is at zero indication the float 34 is at its maximum upper position and the beam 28 forms an angle of $a°$ with the horizontal when the rod 43 is in its vertical position. This is represented diagrammatically in Fig. 6. The various parts of the instrument having been previously adjusted so that the pointer 58 will be at zero indication when the rod 43 is vertical, the instrument will be in condition for operation when it is mounted on the brackets 76 and 77, as above explained.

Before mounting the instrument, as above explained, the false bottom 80 is moved to the bottom of the oil well 23. After the instrument is mounted on the wall and the pipe 39 connected to the furnace draft, the plug 25 may be removed and oil introduced through the elbow pipe 24 until it appears near the upper opening in this elbow pipe. The plug 25 may then be re-inserted.

Now upon turning the wing nut 74 to the left until it stops firmly the valve 67 will be firmly seated on the seat 68, thus cutting off communication from the interior of the bell float 34 to the atmosphere through the passageways 70. The furnace draft will now be connected to the interior of the bell float 34 through the vertical flue 35, thereby producing suction in the chamber inside the bell float 34. As the pressure is reduced inside of the float 34 a corresponding force is exerted tending to move the float down into the oil chamber. The force of the pressure difference in the float is counterbalanced by the lifting of the weight 45 due to the angular movement of the rod 43. This rod being rigidly attached to the walking beam 28 makes the same angular motion as the beam with the only difference that the beam starts from an angle of $a°$ from the horizontal, while the rod starts from an angle of 0° from the vertical.

By following the principles involved in the construction of the instrument it will be seen that the movement of the dial hand is a suction of the relation between the position of the beam and the position of the counteracting weight. That is to say, while the beam and weight 45 traverse the same angle, the two do not start from the same position. It is preferred to select carefully such angles that the motion of the dial hand following the given relation of the angles will make approximately equal steps for equal increments of the pressure difference or suction in the chamber within the bell 34.

The calculation involved in the construction and operation of the draft indicators is as follows:

Let
$f$=force of draft in float chamber.
$A$=working area of float in sq. feet.
$h$=draft in inches of water.

Since 1″ of water is equivalent to 5.2 pounds per sq. foot;

$$f = 5.2Ah \quad (1)$$

Further notation:
$w$=the weight in pounds acting at point 8.
$a$=the angle the beam makes with the horizontal
$b$=the angle the rod 27—45 makes with the vertical.
$r$=the ratio of the length of rod 27-45 to length of portion 31—27 of beam =ratio of lever arms.

By equating the moments for any position of the beam, we have:

$$f \cos a = r w \sin b \quad (2)$$
$$5.2 Ah \cos a = r w \sin b \quad (3)$$

$$\frac{\sin b}{\cos a} = \frac{5.2Ah}{rw} = Kh \quad (4)$$

where $$K = \frac{5.2A}{rw} = \text{constant for the given instrument.}$$

Equation (4) represents the fundamental formula of the draft indicator. This formula governs the weights and dimensions of the various members in the construction of the instrument. The formula applies equally to the several types for indicating and recording the pressure on dial or chart.

The following example will demonstrate the application of the formula in the design and construction of the instrument. The instrument show in the drawings was designed to measure a negative pressure of 2″ of water indicated over an arc of 288° on the dial. A gear ratio of 1 to 5 in the mechanism determined the motion of the beam as 1/5 of 288, or 57.6°. With this data the value of $K$, the constant of the instrument, is determined as follows:

By construction angle "$a$" has its maximum value of 28.8° when angle "$b$" is equal to zero. Therefore we have in general $$a = 28.8 - b. \quad (5)$$

substituting the value of "$a$" in Equation (4) gives $$\frac{\sin b}{\cos (28.8 - b)} = Kh \quad (6)$$

By trigonometry $\cos(28.8 - b) = \cos 28.8 \cos b + \sin 28.8 \sin b$
$\qquad = .8757 \cos b + .4818 \sin b$ $$\frac{\sin b}{.8757 \cos b - .4818 \sin b} = Kh \quad (7)$$

To give a total deflection of 2″ of water the moment of the weight "$w$" is adjusted so as to balance the force of 1″ of water pressure when beam is horizontal (angle $a = 0°$ and angle "$b$" has the value of 28.8° from the vertical. The value of "$K$" for the instrument is determined directly from Equation (6)

$$\frac{\sin 28.8}{\cos (28.8 - 28.8)} = Kh \quad (8)$$

and since "$h$" is equal to 1, therefore $$K = \frac{\sin 28.8}{\cos 0} = .4818 \quad (9)$$

Substituting the value of "$K$" in equation (7) we obtain the values of "$h$" corresponding to the given values of "$b$", and by transposition we obtain the points on the dial corresponding to the desired increments of pressure. It will be noted that an average arc of approximately 1.5° corresponds to .01″ of draft. This with a radius of 4″ gives over one-tenth of an inch for each division of .01″ of water, so that the scale can be read accurately to a fraction of 1/100 of an inch of draft.

If for any reason, such as abnormal conditions of operation which may occur, oil leaks into the draft line from the oil well the wing nut 74 should be turned to the right so as to close the needle valve 66. If oil has leaked into the draft line from within the float it will run out of the passageways 70 shown in Fig. 5. The hexagon cap 72 may be removed from the needle valve so as to permit the oil to be drained more readily from the chamber 69. The pointer 58 should now rest at zero, but if not, the instrument may be set in perpendicular position by loosening its support and tilting the instrument to the right or left until the pointer 58 does rest at zero. It will thus be seen that the double inlet valve shown in Fig. 6 is useful for subsequent calibration of the instrument. This double inlet valve closes the draft from the instrument and opens the float to the atmosphere when desired. When the instrument is in a true vertical position the dial hand will indicate zero on the dial and no other leveling is necessary. When the cap 72 is replaced the valve stem 71 is turned so as to seat the valve 67 on the seat 68 and establish communication between the chamber within the bell float 34 and the draft line. While the oil within the well 23 should be approximately at the level of the upper end of the elbow pipe 24 there may be a variation of as much as one-half inch from the original level without affecting the operation or accuracy of the instrument for all purposes. This is due to the fact that the cross-sectional area of the upper portion of the weight 50 immersed in the liquid has a cross-sectional area equal to the cross-sectional area of the immersed portion of the bell 34. It can readily be seen that when the depth of the liquid decreases the decrease in displacement of the liquid by the immersed portion of the bell 34 is the same as the decrease in the displacement of the liquid of the immersed portion of the weight 50.

In Figs. 3 and 4 is shown a hexagonal thumb bolt 85 adapted to be threaded into a drain opening at the bottom of the well 23. When the bolt 85 is removed the oil in the well 23 may flow out through the opening 86 in the bottom of the well.

At 87 in Fig. 1 I have shown on the dial 16 a scale for the pointer 58 to move over to indicate positive pressures instead of negative pressures. Such readings are useful to indicate, for instance, that the air fed into the furnace is producing a positive pressure and that the draft leading upwardly from the furnace is being checked too much by a damper or otherwise. The furnace attendant will therefore know by the pointer moving to the right from the zero point on the dial that the flow of air into the furnace must be checked or the damper in the chimney opened wider until a proper draft is secured up the chimney so that a negative pressure is indicated by a movement of the pointer in a clockwise direction on the dial.

It should also be understood that the same construction shown in the drawings may be used to indicate positive or negative pressures of a gas in a chamber in which the gas is in a state of equilibrium and not flowing.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In a pressure indicator, the combination with a well adapted to contain a liquid, of a bell closed at its upper end and having its lower end adapted to be immersed in the liquid in said well, a pressure flue extending into said bell in position to cause suction in said bell to lower the bell in said well, indicating mechanism and means for connecting said indicating mechanism to said bell to be operated thereby, counterweight mechanism partially immersed in the liquid in said well and acting to regulate said indicating mechanism to compensate for the varying level of the liquid and means for connecting said counterweight mechanism with said bell to balance one against the other.

2. A pressure indicator comprising a well, a bell adapted to be partially immersed in liquid in said well, and a compensating counterweight in position to be partially immersed in said well for balancing the weight of said bell, said counterweight having a cross-sectional area substantially equal to the cross-sectional area of that position of the bell immersed in said liquid.

3. A pressure indicator comprising a well adapted to contain a liquid, a pressure-operated actuator extending into said well in position for partial immersion in said well, and a compensating counterweight for balancing the weight of said actuator, said counterweight having a cross-sectional area equal to cross-sectional area of the liquid displacing portion of said actuator.

4. A pressure indicator comprising a supporting frame, a well secured to said frame adapted to contain a liquid, a pressure-operated actuator extending into said well for partial immersion in said well, indicating mechanism mounted on said frame connected to said actuator, and counterweight mechanism connected to said actuator and comprising a weight extending into said well for partial immersion in said liquid, said last-named weight having a cross-sectional area at its liquid displacing portion equal to the cross-sectional area of the liquid displacing portion of said actuator.

5. A pressure indicator comprising a well adapted to contain a liquid to a predetermined depth, a bell closed at its upper end and having its lower end extending into said well to secure a liquid seal, a pressure flue extending through said well into the upper portion of said bell, indicating mechanism connected to said bell to be operated thereby, and counterweight mechanism connected to said indicating mechanism to regulate the latter to secure uniform movements of such indicating mechanism, said counterweight mechanism comprising a counterweight extending into said well in position for partial immersion in said liquid, and said last-named counterweight having a liquid dispensing portion of a cross-sectional area equal to the cross-sectional area of the liquid displacing portion of said bell whereby variations within predetermined limits in the depth of said liquid in said well will be compensated for and a predetermined zero indication of the indicating mechanism maintained.

6. A pressure indicator comprising a well adapted to contain a liquid at a predetermined depth, a pressure operated actuator extending into said well for partial immersion therein, indicating mechanism operatively connected to said actuator, and counterweight mechanism connected to said actuator and to said indicating mechanism and comprising means for maintaining predetermined indications with varying depths of liquid in said well.

7. A pressure indicator comprising indicating mechanism having a predetermined zero indication, a well adapted to contain a liquid at a predetermined depth, a pressure operated actuator for said indicating mechanism and in position to be partially immersed in the liquid in said well, means for operatively connecting said actuator to said indicating mechanism and means for compensating for variations in the depth of liquid in said well to maintain such zero indication in readiness for operation by a pressure operating on said actuator.

8. A pressure indicator comprising a dial, a pointer movable over said dial from a zero indication, a pendulum connected to said pointer to move bodily therewith, said pendulum being in vertical position when said pointer is on the zero indication of said dial, a pressure operated actuator operatively connected to said pointer and pendulum, and counterweight mechanism connected to said actuator to regulate said pointer by securing uniform increments of movements over the dial in accordance with the pressure to be indicated.

9. A pressure indicator comprising a walking beam pivoted on a horizontal axis, a pressure operated actuator pivotally suspended from said beam at one side of the fulcrum thereof, a counterweight pivotally suspended from said beam at the other side of said fulcrum, a pendulum connected to said beam to move therewith, indicating mechanism connected to said beam, and an additional counterweight comprising a rod connected to said beam to have a predetermined angular relation to said pendulum.

10. A pressure indicator comprising a frame, a weighted walking beam pivotally mounted thereon, indication mechanism connected to said beam, a pendulum having a predetermined angular relation to said beam and connected thereto, a well adapted to contain a liquid at a predetermined depth, a bell closed at its upper end and having its lower end extending into said well for immersion in the liquid therein, a pressure flue extending through said well into the upper portion of said bell, means for pivotally suspending said bell from said beam at one side of the fulcrum thereof, and a compensating weight suspended from said beam at the other side of said fulcrum in position for immersion in the liquid in said well.

11. A pressure indicator comprising a well adapted to contain a liquid, a pressure-operated actuator adapted to extend into said well for partial immersion in said liquid, indicating mechanism, means connecting said indicating mechanism to said actuator, a compensating counterweight extending into said well for partial immersion in said liquid the portion immersed having vertical surfaces, the cross-sectional area of the upper immersed portion of said counterweight being equal to the cross-sectional area of the immersed portion of said actuator and means for operatively connecting said counterweight with said actuator.

12. In a pressure indicator, the combination with a supporting frame, of a well adapted to contain a liquid at a predetermined depth, a walking beam spaced above said well, a bell pivotally suspended from one end of said beam in position to extend into said well for partial immersion in liquid therein, said bell being closed at its upper end and open at its lower end but sealed by said liquid when immersed, a pressure flue extending through the well upwardly into the upper portion of said bell, an elongated weight pivotally suspended from said beam in position to extend into said well for partial immersion in the liquid therein, the said weight having vertical surfaces over the immersed portion and a cross-sectional area over the upper portion of the immersed portion equal to the cross-sectional area of the immersed portion of said bell, a screw-threaded pendulum rod secured to the said beam to depend vertically from the fulcrum thereof, a screw-threaded rod secured to said beam to lengthen the latter, said rod having a predetermined angular relation to said pendulum, an adjustable weight on said pendulum rod, an additional adjustable weight on said second-named rod, and indicating mechanism connected to said beam to be operated thereby, the relation of the aforesaid parts being such as to maintain a zero indication in readiness for operation with varying depths of liquid in said well.

13. A pressure indicator comprising a bell, a pressure flue extending into the same, indicating mechanism, means for operatively connecting said indicating mechanism to said bell, and valve mechanism disposed in said flue for connecting the interior of said bell to the atmosphere to secure atmospheric pressure within the bell when mounting the indicator to secure zero indication of the indicating mechanism.

14. A pressure indicator comprising a well adapted to contain a liquid, indicating mechanism, pressure-operated means mounted in position to extend into said well, means for connecting said pressure operated means to said indicating mechanism, a false bottom in said well, and means operated from the exterior of the indicator for moving said false bottom as an abutment against the parts extending into the well to hold said parts and the indicating mechanism against vibratory movements during transportation.

15. A pressure indicator comprising a dial, a pointer movable over said dial from a zero indication, a pendulum connected to said pointer to move bodily therewith, said pendulum being in vertical position when said pointer is on the zero indication of said dial, a pressure operated actuator, means for connecting said actuator to said pointer and pendulum, a counterweight, and means disposed at an angle to said pendulum for connecting said counterweight to said actuator to regulate said pointer by securing uniform increments of movement over the dial in accordance with the pressure to be indicated.

16. A pressure indicator comprising a well adapted to contain a liquid, a pressure operated actuator adapted to extend into said well for partial immersion in said liquid, indicating mechanism, means for operatively connecting said indicating mechanism to said actuator, a compensating counterweight and means disposed at an angle to said pendulum for connecting said counterweight to said actuator to regulate said pointer by securing uniform increments of movement over the dial in accordance with the pressure to be indicated.

In testimony whereof I have signed my name to this specification on this 27th day of September, A. D. 1923.

ARTHUR B. CUNNINGHAM.